April 23, 1957 W. R. DOTY 2,789,803
BUBBLE PLATE FOR A FRACTIONATING COLUMN OR THE LIKE
Filed June 8, 1954
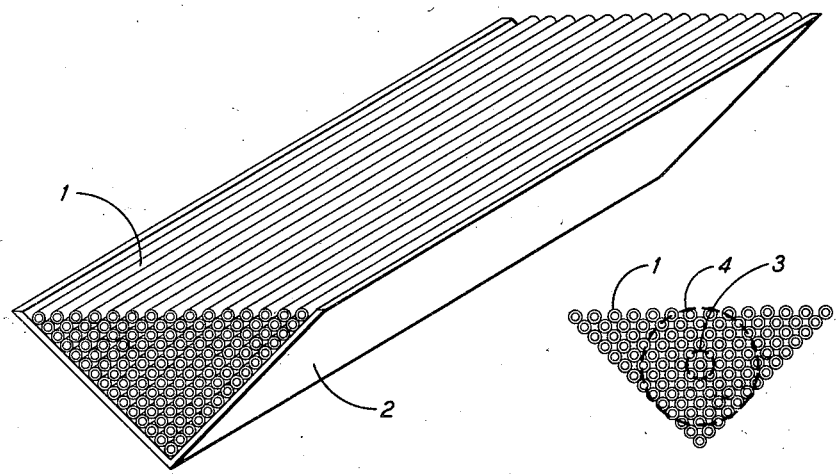
FIG.1
FIG.2
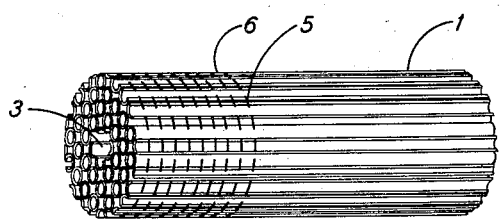
FIG.3
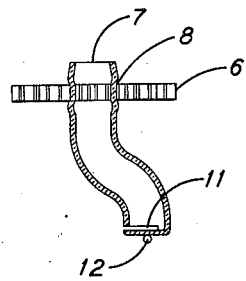
FIG.4
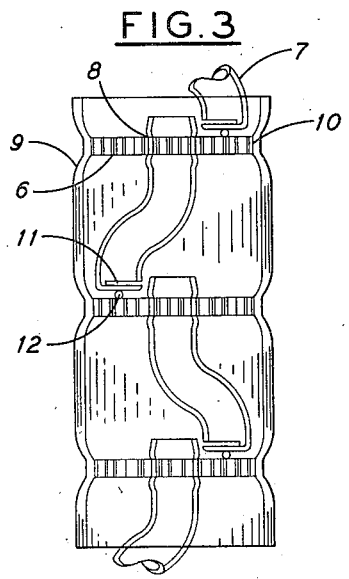
FIG.5
INVENTOR
WILLIAM RUSSELL DOTY
BY
ATTORNEYS United States Patent Office 2,789,803
Patented Apr. 23, 1957

2,789,803

BUBBLE PLATE FOR A FRACTIONATING COLUMN OR THE LIKE

William Russell Doty, Oakland, Calif., assignor to California Research Corporation, San Francisco, Calif., a corporation of Delaware Application June 8, 1954, Serial No. 435,120

2 Claims. (Cl. 261—114)

This invention relates to improved bubble plates for fractionating columns and the like, more particularly, to perforated glass bubble plates useful in laboratory fractionating columns and the like; and has for an object the provision of a simplified laboratory fractionating column glass bubble plate having preformed and uniform perforations.

Various methods of constructing bubble plates, and particularly glass bubble plates for fractionating columns, have been heretofore used, including the formation of perforations by drilling operations, assembling vertical tubes through holes in flat horizontal plates, and by other equally complicated and time-consuming methods. For example, the perforations in plates in the universally used Oldershaw laboratory fractionating column are made by drilling a glass plate with a red-hot tungsten wire, a time-consuming operation whether done by hand or by automatic drilling devices. The fragile nature of many plate materials and the need for uniformity in perforations creates difficult fabrication problems.

This invention comprehends, broadly, a simplified perforated baffle plate, such as perforated glass baffle plates for laboratory fractionating columns, which eliminates many of the difficulties involved in attempting to create uniform perforations in fragile plate material. The bubble plates are constructed by assembling a bundle of sinterable or fusible tubing of a desired size, applying sufficient heat to the bundle to cause contiguous tubes in the bundle to become sintered or fused together, and by cutting transverse slices from the bundle for use as perforated bubble plates in the construction of a fractionating column.

These and other objects and advantages of this invention will be further apparent from the following description of a preferred form of bubble plate when read in connection with the attached drawing which forms a part of this specification.

In the drawing Figure 1 is a pictorial view of a bundle of glass tubes 1 stacked on a heat-resistant V-block 2. Figure 2 is a sectional view of any transverse section taken through the bundle of tubes 1 in Figure 1. Figure 3 is a pictorial view of the bundle of glass tubes 1 shown in Figure 1 after the bundle has been drilled and shaped along the dotted lines 3 and 4 shown in Figure 2. Figure 4 is a sectional elevation view of a subassembly consisting of a glass slice 6 taken transversely from the bundle of tubes 1 shown in Figure 3 and a glass downcomer 7. Figure 5 is an elevation view of a glass distillation column assembly formed in accordance with the present invention and consisting of a glass column 9 and a plurality of subassemblies such as the subassembly shown in Figure 4.

The Figures 1 to 5 illustrate sequentially a preferred series of steps for constructing a glass bubble plate for a fractionating column in accordance with the present invention, which steps are described sequentially in the following paragraphs.

As shown in Figure 1, sinterable glass tubes are stacked in a bundle in a geometrically uniform cross-sectional pattern on a heat-resistant V-block 2 constructed of heat-resistant material such as brass or carbon. Desirably, the sum of the cross-sectional areas surrounding tubes in any portion of the bundle should be equal to the sum of the cross-sectional areas of the holes through the tubes in the same portion of the cross-sectional area of the bundle, so that vapors rising vertically through a horizontally disposed slice taken from the bundle will not tend to seek a preferential path through the slice.

Following stacking of the tubes 1 in a bundle with the desired cross-sectional pattern, heat is applied to the bundle until contiguous tubes 1 in the bundle become sintered together, desirably by transporting the V-block 2 containing the tubes 1 into a furnace where heat can be applied to and removed from the bundle in a controlled manner. The furnace temperatures necessary at various stages in the sintering operation depend upon various factors which are known matters of experience in the glass working art, including the type and size of glass tubing used, the degree of sintering desired, and the quality of annealing desired. I have found that for the Pyrex glass tubes of the small sizes that would normally be selected to make bubble plates for laboratory fractionating columns, the furnace temperature is desirably brought up to about 1620° F. at which point the furnace is shut off and the temperature allowed to fall slowly to about 950° F. which is within the critical temperature range where Pyrex glass develops strains. If so desired, the temperature can be lowered at a greater rate below this critical temperature range. Although when cooled the bundle of glass tubes 1 is already annealed, desirably it is returned to the annealing oven at a temperature of about 1020° F., where any "built-in" strains are allowed to dissipate themselves for about 40 minutes, after which the bundle is allowed to cool slowly at least through the critical strain point of about 950° F.

As shown in Figure 2, a hole 3 is drilled longitudinally through the bundle of sintered tubes 1 in order that a passage for the reception of a liquid downcomer conduit will exist in each transverse slice to be taken from the bundle, and a circular cut 4 is made longitudinally through the bundle in order to shape the periphery of the bundle to the exact form desired for bubble plates.

As shown in Figure 3, transverse cuts 5 are made across the bundle of sintered tubes 1 to secure slices 6 with a honeycomb appearance and of the desired thickness for bubble plates.

As shown in Figure 4, a glass downcomer 7 is inserted in the hole 3 in each slice 6 and is desirably flame-fused to slice 6 at all points of contact path between the downcomer 7 and the slice 6. The downcomer 7 is desirably closed at its lower end and provided with an outlet slot 11 below the level of the top of the adjacent downcomer in the next lower plate. The downcomer 7 is shown in Figure 4 as being curved, to assist in the assembly of the individual plates into a column; however, a downcomer of any desired shape or size may be used. The location of bore 3 is shown in Figure 2 as being in the center of each plate, although it may be formed off center in each plate if desired. A glass bead 12 is provided at the lower end of each downcomer 7 to serve as a means of anchoring the downcomer to the next lower plate while maintaining the maximum number of unobstructed openings in said lower plate.

As shown in Figure 5, the combined slices 6 and downcomer 7 are assembled in glass column 9 and are desirably fused in place in glass column 9 at points of contact 10 between slices 6 and column 9.

In conclusion, the present invention contemplates generally the stacking of sinterable, or fusible, tubes into a bundle of geometrically uniform cross-sectional pattern and the sintering or fusing together of contiguous tubes in said bundle, from which transverse slices are thereafter taken to form the basic elements for perforated fractionating column bubble trays.

Although a specific arrangement and mode of construction has been described and illustrated, it is obvious that numerous changes could be made in the methods and materials disclosed herein without departing from the invention, and all such changes which fall within the scope of the appended claims are intended to be embraced thereby.

I claim:

1. A unitary glass bubble plate and downcomer for a laboratory fractionating column or the like, comprising a plurality of short sections of small bore contiguous tubes sintered to form a flat plate, an axial tube of larger bore projecting upwardly and downwardly from said plate to form a downcomer, the upper end of said tube being open and parallel to said plate, the lower portion of said tube being offset laterally and closed at its lower end, and a transverse outlet slot adjacent said closure and parallel to said plate.

2. A fractionating column or the like having a plurality of unitary glass bubble plates and downcomers, each comprising a plurality of short sections of small bore contiguous tubes sintered to form a flat plate, an axial tube of larger bore projecting upwardly and downwardly from said plate to form a downcomer, the upper end of said tube being open and parallel to said plate, the lower portion of said tube being offset laterally and closed at its lower end, and a transverse outlet slot adjacent said closure, said plates being assembled into said column with said outlet slots below the level of the top of the downcomer tube of said next lower bubble plate to form a vapor seal therefor.

References Cited in the file of this patent

UNITED STATES PATENTS

| 2,484,003 | Simison | Oct. 4, 1949 |
| 2,575,193 | Shire | Nov. 13, 1951 |

FOREIGN PATENTS

| 425,413 | Great Britain | Mar. 11, 1935 |
| 507,711 | France | July 2, 1920 |